United States Patent [19]
Herbelleau

[11] Patent Number: 5,587,030
[45] Date of Patent: Dec. 24, 1996

[54] TIRE HAVING CARCASS REINFORCEMENT FORMED OF STRIPS

[75] Inventor: Yves Herbelleau, Riom, France

[73] Assignee: Sedepro, Paris, France

[21] Appl. No.: 458,737

[22] Filed: Jun. 2, 1995

[30] Foreign Application Priority Data

Jun. 28, 1994 [FR] France .................................. 94 08304

[51] Int. Cl.$^6$ ................ B60C 9/00; B60C 9/02; B60C 9/08
[52] U.S. Cl. .................. 152/555; 152/548; 152/556; 152/558; 152/560; 156/117
[58] Field of Search .................. 156/117; 152/458, 152/548, 555–561, 533, 196–198

[56] References Cited

U.S. PATENT DOCUMENTS

| | | |
|---|---|---|
| 1,519,522 | 12/1924 | Weigel . |
| 1,894,237 | 1/1933 | Mallory . |
| 3,789,899 | 2/1974 | Kobayashi . |
| 3,844,327 | 10/1974 | Marzocchi ........................ 152/556 X |
| 4,890,659 | 1/1990 | Harakon et al. . |
| 5,372,172 | 12/1994 | Iseki . |

FOREIGN PATENT DOCUMENTS

| | | | |
|---|---|---|---|
| 215827 | 2/1958 | Australia ........................ 152/533 |
| 446749 | 12/1912 | France . |
| 472846 | 12/1914 | France . |
| 650886 | 9/1937 | Germany . |
| 992631 | 5/1965 | United Kingdom . |

*Primary Examiner*—Adrienne C. Johnstone
*Attorney, Agent, or Firm*—Brumbaugh, Graves, Donohue & Raymond

[57] ABSTRACT

A tire has a carcass reinforcement preferably formed of a series of circumferential turns of a strip formed of a matrix of elastomeric material reinforced by cords which are arranged side by side and extend transversely in the strip, the turns of strip being arranged in such a manner that, when observed in radial section, they exhibit at least a certain overlap.

7 Claims, 1 Drawing Sheet

TIRE HAVING CARCASS REINFORCEMENT FORMED OF STRIPS

BACKGROUND OF THE INVENTION

The present invention relates to tires. More particularly, it relates to the carcass reinforcement of tires.

Tires are reinforced by cords (metallic, rayon, aramid, polyester, nylon, etc.) arranged in plies, namely carcass plies which extend from one bead wire to the other, being practically always of radial type at the present time, and crown plies constituting, together with the carcass ply, the crown reinforcement known as the belt, plus at times other plies which play a reinforcing or protective role. On an industrial scale, these plies are prepared in the form of semi-finished products characterized, from a geometrical standpoint, by their width and by the angle which the cords form with respect to the longitudinal direction, and they are made up in the form of coils. These coils are then mounted on assembly machines for the manufacture of the tire.

In order to assure an excellent mechanical attachment of the tire to the wheel, the carcass ply is firmly anchored in the bead of the tire. In order to assure this anchoring, various architectures are possible; for example, the cords can be passed below a bead wire, around which they are turned up. The plan and the manufacturing data giving the different components of the tire, their nature and their precise location within the vulcanized tire are referred to as the "architecture".

Certain reinforcement architectures are also known in which a reinforcement is made directly from a single coil of cord, at the time of the building of the tire. Thus, for instance, it has become very common to hoop the crowns of high-speed tires by cord arranged at zero degree. Such a reinforcement is effected by winding the cord over the crown of the tire. Another example is provided by EP 0 582 196 in which it is proposed that the carcass reinforcement be formed from a cord which extends back and forth from one bead of the tire to the other, with the addition of circumferentially wound cords to serve the function of the bead wire.

Finally, in order to achieve the desired performance, different rubber mixes must be formulated, depending on whether they are used in the beads, in the side walls, in the shoulders or in the crown, and depending on the precise place in these different parts. In fact, the performances of tires depend both on the rubber compositions used and on the cords of the reinforcements, as well as on the arrangement of the latter and their material.

The tires formed in this manner give excellent results as to their performance on vehicles. However, their manufacture is still rather difficult and frequently costly.

SUMMARY OF THE INVENTION

The object of the present invention is to provide a tire which, without impairment of its performance or its uniformity, is very economical to manufacture and requires only very simple and inexpensive manufacturing material. Another object of the invention is to propose a technique of design of the reinforcements by cords which makes it possible very easily to adjust the performance characteristics of the tire without having recourse to more and more sophisticated rubber mix formulations.

In accordance with the invention, the tire reinforced by at least one carcass reinforcement present at least in the sidewalls is characterized by the fact that the carcass reinforcement comprises a circumferential arrangement of lengths of cord arranged side by side and extending transversely with respect to the circumferential direction, they being embedded in a matrix of elastomeric material, said circumferential arrangement being such that when the carcass reinforcement is viewed in radial section, said lengths of cord show at least a certain overlap.

When an arrangement or direction is referred to as "circumferential", reference is had to a figure which is substantially one of revolution around the axis of rotation of the tire; for example, a group of concentric circles or a spiral (in the sidewalls), or a helix (below the tread), which are centered on the axis of rotation of the tire may form a circumferential arrangement within the meaning of the present invention. Within the meaning of the present invention, a "length" is a piece of cord limited in length by cuts. It is a piece of a length less than the height of the sidewall of the tire in question.

In the present invention, the arrangement of lengths of cord forms, in overall view, circular figures which are very substantially centered on the axis of rotation of the tire. However, the lengths of cord in question here are not oriented circumferentially; it is their arrangement, that is to say their grouping in a certain order, which is referred to as circumferential. In the particular case of a radial tire, the lengths are oriented radially, that is to say perpendicular to the orientation of the arrangement.

In accordance with one embodiment of the present invention, the tire is characterized by the fact that the carcass reinforcement is formed of a series of circumferential turns of a strip formed of a matrix of elastomeric material reinforced by cords which are arranged side by side and extend transversely in said strip, the turns of strip being arranged in such a manner that, when observed in radial section, they exhibit at least a certain overlap. Said strip can, upon the manufacture of the tire, be wound by rotation of the tire around its axis. It is oriented circumferentially, except for the winding pitch.

In the present specification, "strip" means a semi-finished product having the shape of a ribbon, comprising a matrix of elastomeric material in which transversely extending reinforcement cords are arranged in said strip.

In a variant embodiment of the invention, the carcass reinforcement furthermore comprises a reinforcement of circumferentially directed cables, arranged in the side walls.

In the present specification, the expression "cord" designates, very generally both monofilaments and multifilaments or assemblages such as cables, twists or any type of equivalent assemblage and this, whatever the material and the treatment of these cords, for instance surface treatment or coating or precoating in order to promote adherence to the rubber.

DESCRIPTION OF DRAWINGS

The following figures illustrate the invention in non-limitative manner and make it possible to understand how it can be carried out.

DESCRIPTION OF PREFERRED EMBODIMENTS

Figure 1:
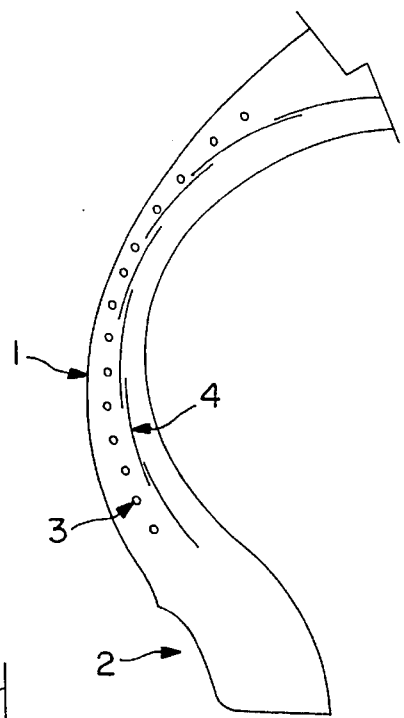
FIG. 1 is a partial section through a tire according to the invention.
Figure 2:
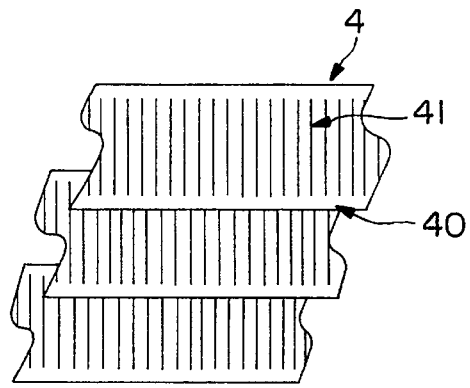
FIG. 2 is a front view, perpendicular to FIG. 1, showing only the arrangement of the carcass reinforcement.

FIGS. 1 and 2 illustrate the carcass reinforcement only as it appears in a sidewall 1 of the tire, in order to simplify the showing of the invention. However, it goes without saying that such a carcass can extend towards and into the beads and below the tread of the tire.

The carcass reinforcement is formed of a series of turns of a strip 4, arranged in helix with a slight overlap between the adjacent turns of strip. There is concerned a circumferential winding effected both in the beads and sidewalls and in the crown of the tire. The overlap makes it possible to assure the continuity of the reinforcement structure from the crown to the beads, moving in any radial plane containing the axis of rotation of the tire. We may note that it is sufficient for the overlap to be present where the continuity of the carcass reinforcement cannot be assured by other means of reinforcement, such as, for instance, in the sidewalls. Below the crown, the continuity of the reinforcement structure can be assured by crown plies, and at the level of the beads the continuity can be assured by other reinforcement plies if necessary.

Figure 4:
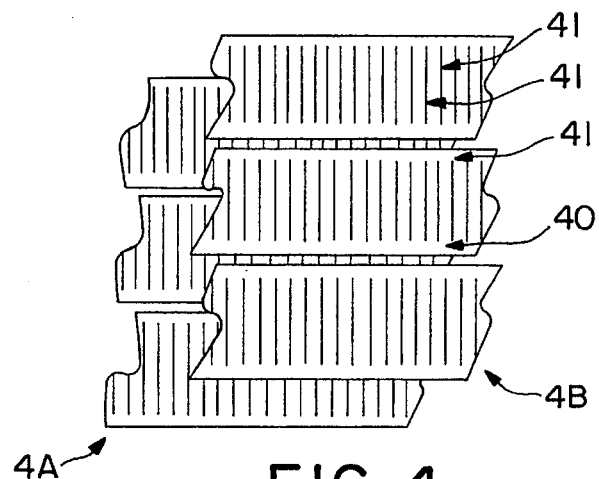
FIG. 4 is a front view, perpendicular to FIG. 3, showing only the arrangement of the carcass reinforcement.

The strip itself is formed of a matrix 40 of elastomeric material reinforced essentially by cords 41 arranged side by side and extending transversely, that is to say essentially across the width of the strip or, otherwise stated, from one edge of the strip to the other. The cords 41 are arranged along the angle desired as a function of the tire which it is desired to manufacture. In order to produce a radial carcass tire, the cords are, of course, arranged perpendicular to the edges of the strip, as is shown in FIGS. 2 and 4.

Figure 5:
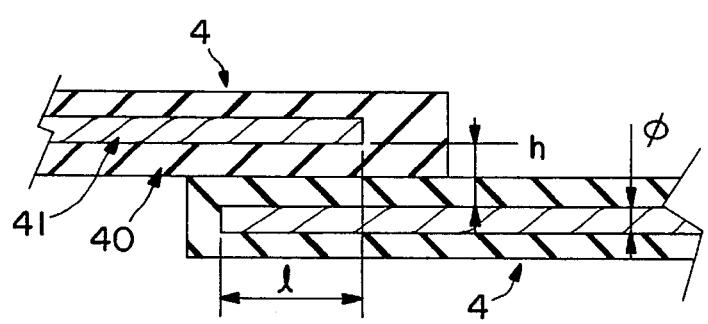
FIG. 5 is an enlarged view which explains certain parameters of the invention.

The overlap preferably respects the following conventional relationship:

$$\frac{1}{\phi} \geq \sqrt{\frac{Ef}{Em} \frac{h}{\phi}}$$

in which, as shown in FIG. 5, l is the length of overlap, $\phi$ is the diameter of the cord, Ef the Young's modulus of the reinforcement cords 41, Em the Young's modulus of the matrix of elastomeric material, h the distance between reinforcement cords corresponding to the thickness of the elastomeric material interposed between the cords belonging to different turns of strip in the zone of overlap. The two moduli in question are those determined at a level of deformation representative of the stresses in use, namely with 2.5% elongation.

The strip can be produced, for instance, by the customary technique of preparing plies, namely cut to the desired angle and then butted in order to form coils ready for use, or else by any other suitable means. By using a cutting and butting technique, the cords extend transversely over the entire width of the strip and their cut section appears on the edges of the strip, contrary to what is shown in FIGS. 2, 4 and 5, in which it is seen that the end of the lengths of cord does not reach the edge of the strip used. In this latter case, the total width of the strip is greater than the width (projected in the direction perpendicular to the greater length of the strip) occupied by the reinforcement cords. In accordance with the technique for the production of the strips, there may possibly be filling cords which have no reinforcement role.

The tire of the invention can be manufactured entirely by winding around the axis of rotation of its different components, as will be explained below, adopting for this a variant embodiment of the invention which concerns specifically the production of the beads and by adopting the process which will be indicated.

The tire can be made on a support which imposes the shape of its inner cavity, such as for instance a removable rigid core. Other types of support, for instance supports employing an inflatable reinforced bladder, can be used. All the components of the tire are applied onto this support in the order required by the final architecture, they being deposited directly in their final place without undergoing shaping at any time during the building. The carcass reinforcement or reinforcements are obtained by winding one or more turns of strip with overlap, as stated above. The crown reinforcements can be obtained by winding strips the cords of which form the desired angle, with or without overlap, as shown in FIGS. 6 and 7 or 10 and 11 of U.S. Pat. No. 1,894,237. The anchoring of the carcass in the beads can be effected, in the manner taught in EP Patent Application 0 582 196. The rubber products are obtained, for instance, by the winding of rubber ribbons. We may furthermore note that, as a variant, the length can be projected onto the support by a member such as that described in U.S. Pat. No. 4,804,436.

Figure 3:
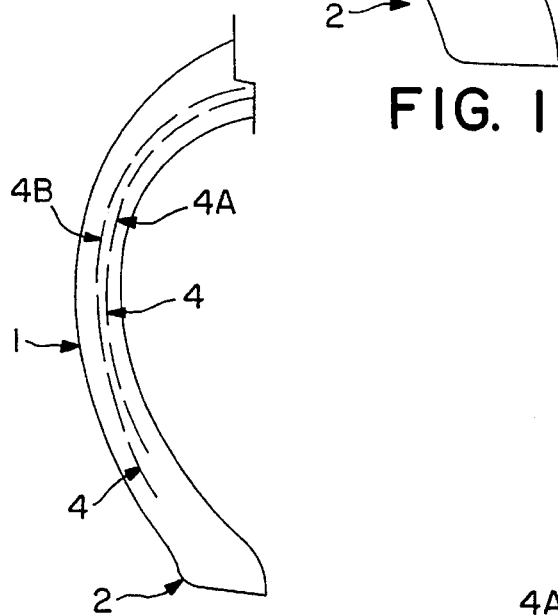
FIG. 3 is a partial radial section through a second embodiment.

In order to assure the overlap of the turns of strip, one can, as shown in FIGS. 1 and 2, cause the strip portion deposited in one turn to overlap the strip portion deposited in the preceding turn. This is depositing by helical winding with overlap from one turn to the other. FIGS. 3 and 4 illustrate another possibility. A first layer 4A of turns of strip is arranged with their edges adjacent each other, whereupon at least one additional layer 4B is deposited in which the turns of strip are applied staggered with respect to the turns of strip of the first layer 4A. There is depositing by helical winding without overlap in at least two consecutive passes with stagger in the transverse direction from one pass to the other in order to obtain the necessary overlap between turns of strip.

If it is desired to define a shape which is different from the natural equilibrium shape of an inflated radial carcass, that is to say if it is desired perfectly to control the shape of the tire when it is inflated on a wheel, one can add cords 3 of zero degree in the side wall, or at least in a large portion thereof, with possibly a variable density of deposit, as illustrated in FIG. 1, without this being limited to this embodiment.

Due to the means which have just been explained, it is possible to have the characteristics of the reinforcement of the tire vary very gradually. In particular, by using a bead without bead wire, reinforced by circumferentially oriented cords 3, the transition between the bead and the sidewall may be of any desired progressivity. It is sufficient to vary the density of cords of zero degree or the rate of overlap of the turns of strip in order to regulate certain characteristics of the behavior of the tire by modifying the local rigidities. One can also select circumferential cords 3 in the sidewall which are of a nature different from the circumferential cords of the bead. Another manner of varying the reinforcing characteristics consists in using cords of the same nature, selected in different diameters.

For example, the carcass cords 41 are of rayon or polyester, the zero-degree cords in the bead are metallic, and the cords 3 which are possibly added in the sidewalls are of aramid.

The tire proposed can be made entirely by winding operations on a support, preferably on a support the apparent surface of which on which the component elements of the tire are wound approaches or corresponds to the inner shape of the tire. Thus, the operations of shaping and turning up of plies or the like are limited or eliminated. It may be made completely from ribbons of rubber and reinforced strips the dimensions of which do not depend upon the dimensions of the tire. This considerably decreases the number of semi-finished products, which has a determinative influence on the industrial cost price.

I claim:

1. A tire reinforced by at least one so-called carcass reinforcement present at least in the sidewalls of said tire in which the carcass reinforcement has a circumferential arrangement of lengths of cord arranged side by side, said lengths being of a length less than the height of the sidewall of the tire in question, said lengths extending transversely with respect to the circumferential direction, said lengths being embedded in a matrix of elastomeric material, said circumferential arrangement being arranged in such a manner that, when the carcass reinforcement is observed in radial section, said lengths of cord show at least a certain overlap.

2. A tire according to claim 1, characterized by the fact that the carcass reinforcement is formed of a series of circumferential turns of a strip comprising a matrix of elastomeric material reinforced by cords arranged side by side and extending transversely in said strip, the turns of strip being arranged in such a manner as to present, when observed in radial section, at least a certain amount of overlap.

3. A tire according to claim 1, characterized by the fact that the overlap respects the following relationship:

$$\frac{1}{\phi} \geq \sqrt{\frac{Ef}{Em} \cdot \frac{h}{\phi}}$$

in which l is the length of overlap, $\phi$ is the diameter of the cord, Ef the Young's modulus of the reinforcement cords, Em the Young's modulus of the matrix of elastomeric material, h the distance between reinforcement cords corresponding to the thickness of the elastomeric material interposed between the cords belonging to different turn of strip in the zone of overlap.

4. A tire according to claim 2, characterized by the fact that the overlap is obtained by an overlapping of the strip portion deposited in a given turn on the strip portion deposited in the preceding turn.

5. A tire according to claim 2, characterized by the fact that the strip portion deposited in a given turn is arranged adjacent the one deposited in the preceding turn, without overlap, and by the fact that the overlap is obtained by at least one additional layer of turns of strip in which the turns of strip are arranged staggered with respect to the turn of strip of the first layer.

6. A tire according to claim 1, in which the cords are oriented radially.

7. A tire according to claim 6, characterized by the fact that the carcass reinforcement furthermore comprises at least one layer of circumferentially oriented cords, arranged in the sidewalls.

* * * * *

UNITED STATES PATENT AND TRADEMARK OFFICE
CERTIFICATE OF CORRECTION

PATENT NO. : 5,587,030
DATED : Dec. 24, 1996
INVENTOR(S) : Herbelleau

It is certified that error appears in the above-indentified patent and that said Letters Patent is hereby corrected as shown below:

<u>Col. 6, line 10</u>, "turn of strip" should read --strip portions--;

<u>bridging lines 20-21</u>, "turns of strip" should read --strip portions--; and <u>bridging lines 21-22</u>, "turn of strip" should read --strip portions--.

Signed and Sealed this

First Day of April, 1997

Attest:

BRUCE LEHMAN

*Attesting Officer*  *Commissioner of Patents and Trademarks*